A. A. Wilder,
Clapboard Machine,
No. 2,247, Reissued May 15, 1866.
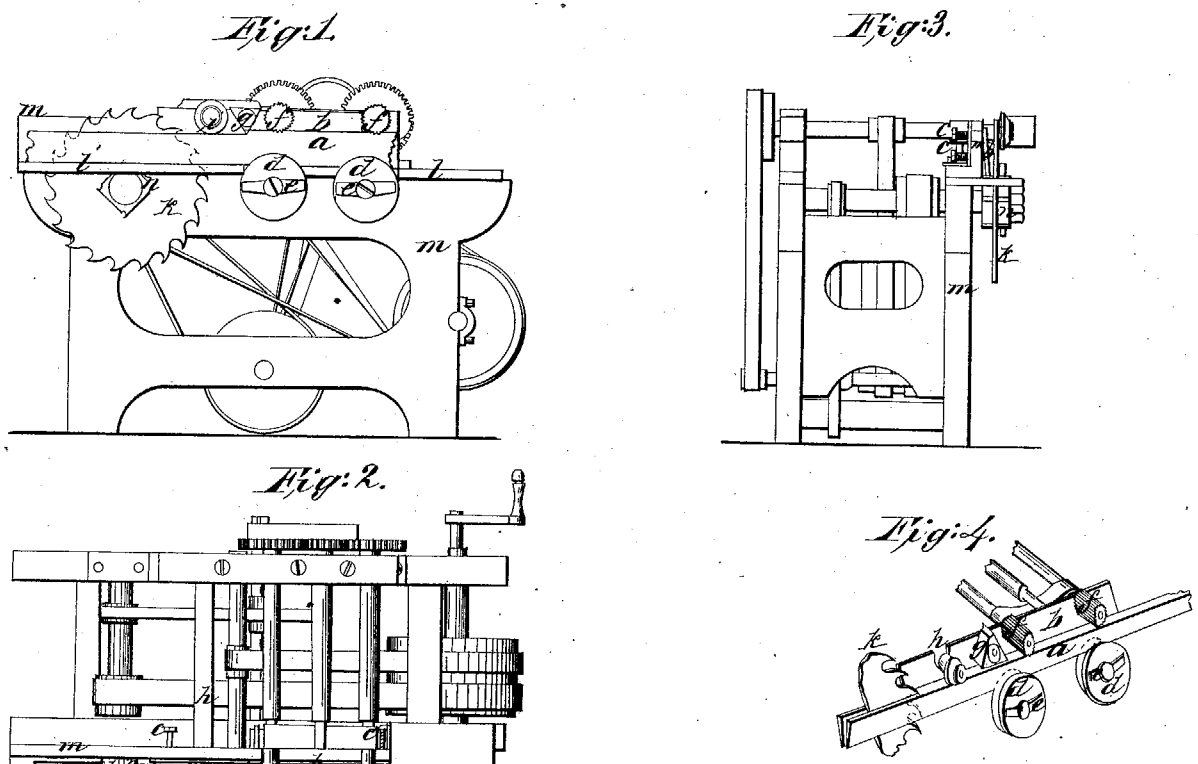
AM. PHOTO-LITHO. CO. N.Y. (OSBORNE'S PROCESS)

UNITED STATES PATENT OFFICE.

ARETUS A. WILDER, OF DETROIT, MICHIGAN.

IMPROVEMENT IN MACHINES FOR SAWING AND EDGING CLAPBOARDS.

Specification forming part of Letters Patent No. 13,734, dated October 30, 1855; Reissue No. 840, dated October 18, 1859; Reissue No. 2,247, dated May 15, 1866.

*To all whom it may concern:*

Be it known that I, ARETUS A. WILDER, of the city of Detroit, county of Wayne and State of Michigan, have invented an Improvement in Sawing and Edging Clapboards, and bringing them to the same width at one operation; and I do hereby declare the following is a full, clear, and exact description of the principle or character which distinguishes it from all other similar machines before known, as also of the usual manner of constructing and operating the same, reference being had to the accompanying drawings, in the several figures of which like parts are designated by like letters.

Figure 1 is a side elevation of my machine. Fig. 2 is a top or plan view. Fig. 3 is an end view; Fig. 4 a perspective view of a detached portion.

In order to enable others to make and use my machine, I will proceed to describe it.

The nature of my invention consists in resawing and bringing plank or boards to an equal width at the same time.

In the drawings, *k* represents a circular saw arranged with its plane of motion parallel to the vertical side *m* of the frame of the machine, and at a distance from the said side of the frame equal to about one-half the usual thickness of the plank to be operated upon. Close to the side *m*, and extending in rear of the saw, cutters, flanged and feed-rollers, there is an adjustable back-rest. It consists of a plate, *b*, which can be set at various angles with the vertical side *m* of the frame by means of the set-screw *c c*. The plank, during the time it is operated upon by the saw and cutters, is slid along the back-rest by means of feed-rollers *f f*, and it is pressed close to the back-rest by means of the flanged rollers *d d*, at the lower edge of the plank, and by one flanged roller, *i*, at the upper edge of the plank. The flanged roller *i* is arranged on a shaft, *h*, between the rotary cutter-head or planer *g* and saw *k*. The flanged rollers *d d* are placed below and in vertical lines with the feed-rollers *f f*, which are loose on their shafts, and are pressed against the back-rest *b* by means of springs *e e*, which are fastened to the outer ends of said shafts. The plank thus confined to the back-rest passes first under the cutter *g*, which planes its upper edge, and then it is operated upon by the saw. As the saw uniformly cuts in a vertical plane, (whereas the plank has a certain inclination equal to the inclination given to the back-rest *b*,) the outer sides of the plank will be oblique to the cut made by the saw, and as the inclination of the back-rest is adjustable, as above described, clapboards of any desired taper can be produced by this machine. The lower edge of the plank is planed by means of rotary cutters *n*, arranged on each side of the saw *k*, at its center or on its arbor. The lower edge of the plank during the operation of sawing, and after leaving the flanged rollers *d d*, passes over the horizontal table *l'*.

Having thus described my invention, what I claim as new, and desire to secure by Letters Patent of the United States, is—

1. The flanged rollers *d*, with their springs *e*, or equivalents, in combination with the adjustable back-rest *b*, for the purpose hereinbefore described.

2. The combination of the circular saw *k* and the rotary edging-cutters *n*, attached to its arbor, with the upper rotary edging-cutter, *g*, for the purpose herein described.

ARETUS A. WILDER.

Witnesses:

S. S. FAHNESTOCK,

JOHN D. BLOOR.